(12) United States Patent
Streubel et al.

(10) Patent No.: US 7,235,209 B2
(45) Date of Patent: Jun. 26, 2007

(54) APPARATUS FOR HEAT TREATMENT OF STRUCTURAL BODY PARTS IN THE AUTOMOBILE INDUSTRY

(75) Inventors: Wolfgang Streubel, Detmold (DE); Udo Klasfauseweh, Gütersloh (DE); Thomas Harbarth, Paderborn (DE); Todd William Jilles Tjoelker, Grand Rapids, MI (US)

(73) Assignee: Benteler AG, Paderborn (DE)

( * ) Notice: Subject to any disclaimer, the term of this patent is extended or adjusted under 35 U.S.C. 154(b) by 413 days.

(21) Appl. No.: 10/892,418

(22) Filed: Jul. 15, 2004

(65) Prior Publication Data

US 2005/0006828 A1    Jan. 13, 2005

Related U.S. Application Data

(60) Continuation-in-part of application No. 10/066,084, filed on Jan. 31, 2002, now abandoned, which is a division of application No. 09/460,333, filed on Dec. 10, 1999, now abandoned.

(30) Foreign Application Priority Data

May 12, 1999   (DE)   ............................... 199 22 003
Nov. 19, 1999  (EP)   .................................. 99123002

(51) Int. Cl.
*C21D 9/62*   (2006.01)
*C21D 1/10*   (2006.01)

(52) U.S. Cl. ....................... 266/104; 266/119; 266/129; 219/658

(58) Field of Classification Search ................ 266/104, 266/119, 129; 219/658, 652
See application file for complete search history.

(56) References Cited

U.S. PATENT DOCUMENTS

| 3,757,072 | A | * | 9/1973 | DelPaggio | .................. 219/650 |
| 4,786,772 | A | * | 11/1988 | Umemoto et al. | .......... 219/643 |
| 6,178,798 | B1 | * | 1/2001 | Kowalski et al. | ............. 72/200 |
| 6,454,884 | B1 | * | 9/2002 | McNulty et al. | ............ 148/520 |
| 2005/0006828 | A1 | * | 1/2005 | Streubel et al. | ............. 266/104 |

FOREIGN PATENT DOCUMENTS

| DE | 1154819 | * | 9/1963 |
| DE | 1758672 | * | 12/1970 |
| DE | 2527026 | * | 12/1976 |

OTHER PUBLICATIONS

ASM handbook, vol. 4, Heat Treating, pp. 183, and 194-196, Apr. 1995.*

* cited by examiner

*Primary Examiner*—Scott Kastler
(74) *Attorney, Agent, or Firm*—Henry M. Feiereisen

(57) ABSTRACT

Apparatus for heat-treating an elongate structural body part made from a blank compressed while being soft or from steel strip of hardenable 22 Mn B5 mod. steel sheet with a thickness of 1 mm to 3 mm, includes an apparatus for positioning the structural body part in substantially upright disposition. Placed in surrounding relationship to the structural body part is an induction element which can move from bottom to top, thereby being able to follow a contour of the structural body part and allowing to at least partially heat the structural body part to an austenitizing temperature suitable for hardening. Disposed adjacent to the induction element is a cooling unit which follows the induction element in movement direction. The induction element and the cooling unit are moveable relative to one another and connected to a tool carriage which is mounted to a column for movement in a vertical direction, in a transverse direction to the column and about a horizontal axis.

13 Claims, 4 Drawing Sheets

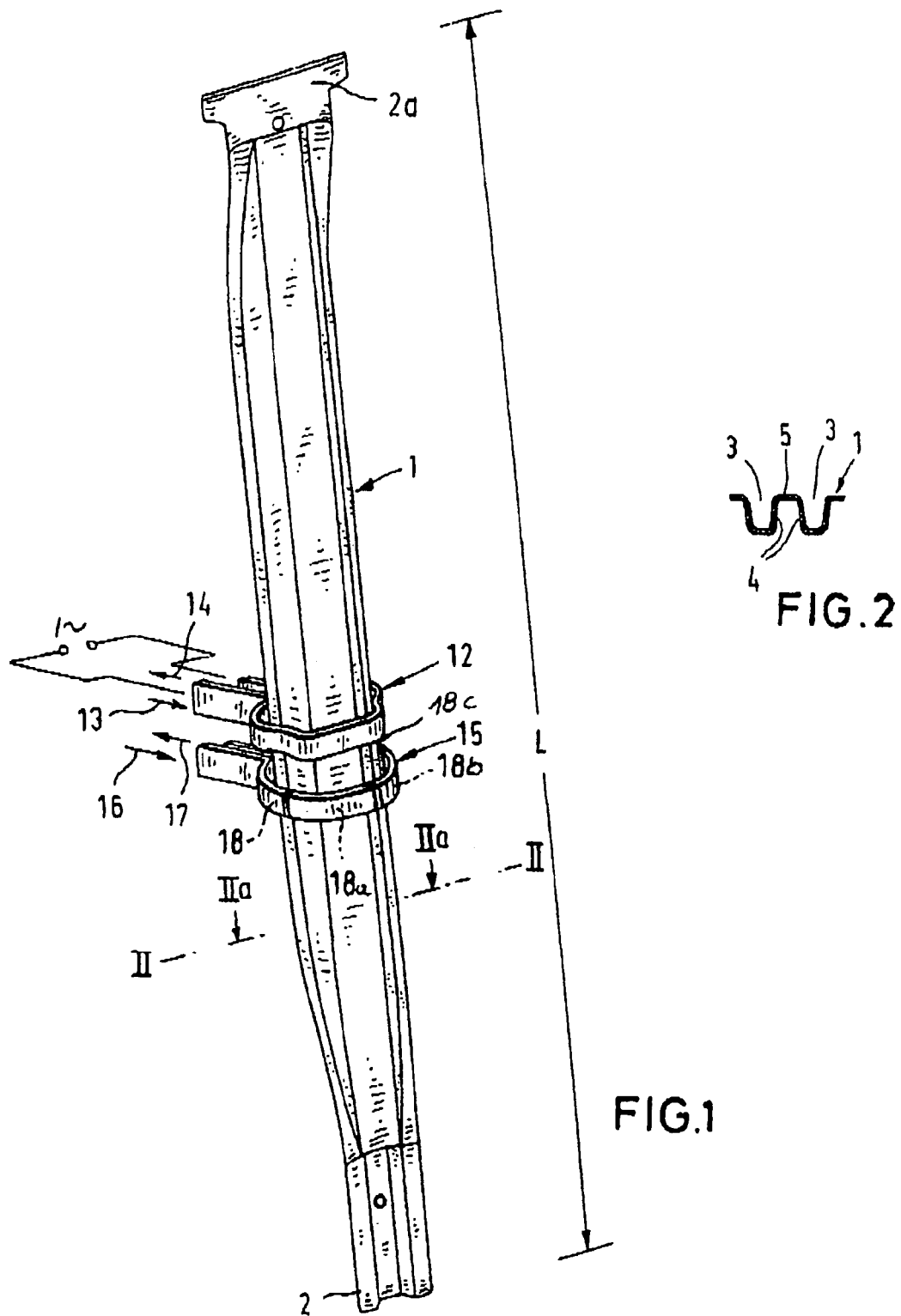

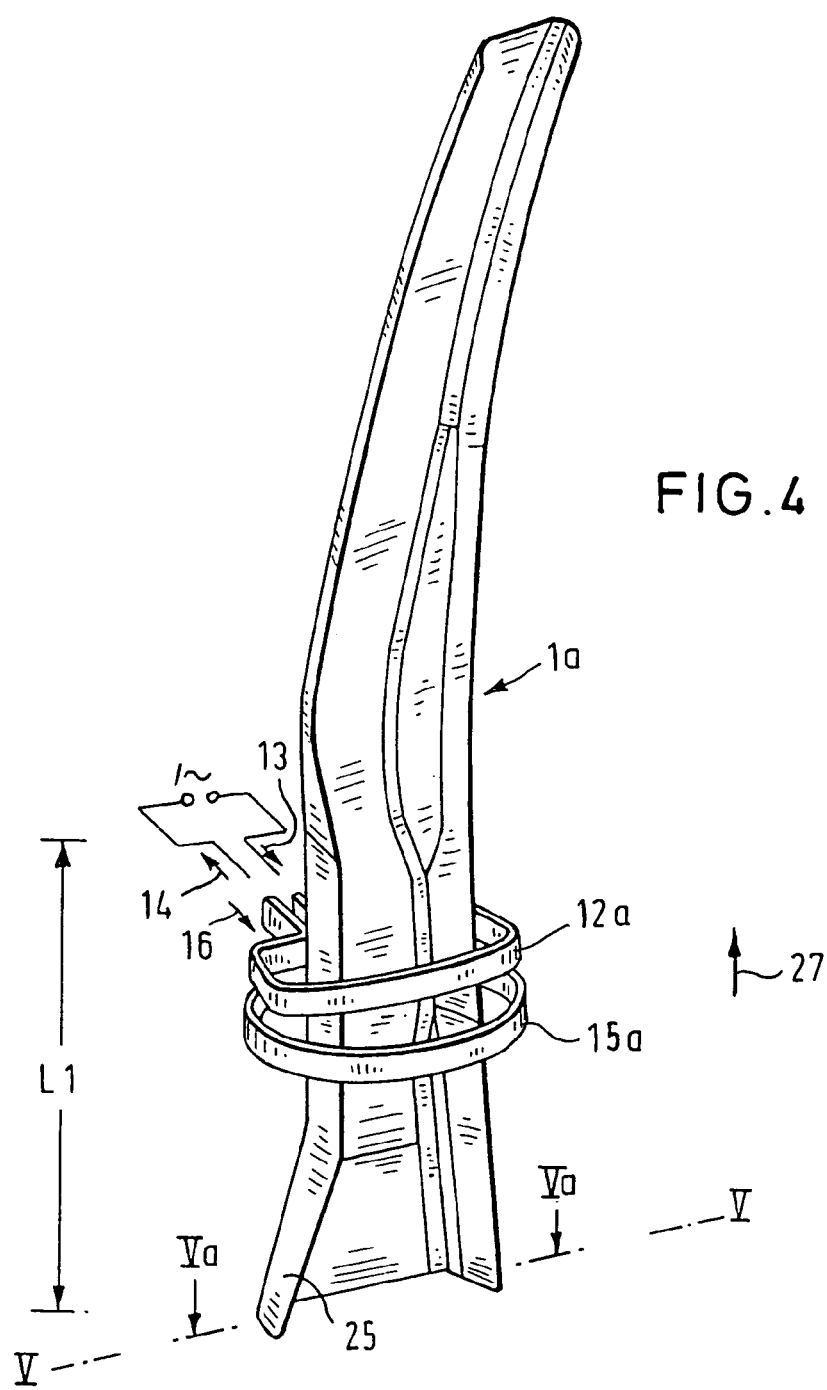
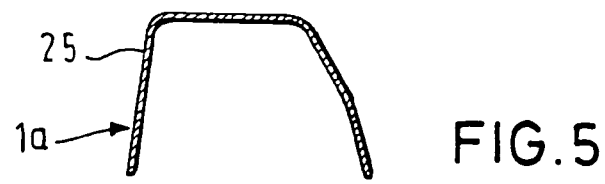

APPARATUS FOR HEAT TREATMENT OF STRUCTURAL BODY PARTS IN THE AUTOMOBILE INDUSTRY

CROSS-REFERENCES TO RELATED APPLICATIONS

This application is a continuation-in-part of prior filed copending U.S. application Ser. No. 10/066,084, filed Jan. 31, 2002 now abandoned, which is a division of U.S. application Ser. No. 09/460,333, filed Dec. 10, 1999, now abandoned, which claims, pursuant to 35 U.S.C. 119(a)–(d), the priority of German Patent Application, Ser. No. 199 22 003.4, filed May 12, 1999, and European Patent Application, Ser. No. 99123002.0, filed Nov. 19, 1999.

BACKGROUND OF THE INVENTION

The present invention relates, in general, to body structures in the automobile industry, and more particularly to an open-profile, elongate structural body part as safety elements for automobile body construction.

Structural body parts in the form of thin-walled side impact supports, bumpers, cross members, longitudinal member, roof frames and column reinforcements are known. Because of more stringent requirements, the use of high strength and highest strength steels has increased. The structural body parts, in general, are manufactured as pressed parts from sheet steel. In addition to a very high strength, such structural body parts must have a minimum ductility of 5% to 10%.

The use of cold-formable, high strength steels has also been proposed. However, these steels are suitable only for structural body parts with a simple shaping because of their limited shaping and deforming properties. Another approach involves the use of hardenable steel sheets. These steel sheets in the form of blanks or coil material are shaped in pressing tools to structural body parts while still soft. The structural body parts are then provided with the required strength in a subsequent hardening process. These steel sheets in their soft state have sufficient shaping and deforming properties and thus can be used to produce structural body parts of complex shape. One example of a material with such properties includes 22 Mn B5 mod. This material has in its soft state a strength of approximately 600 N/mm$^2$ and a ductility of greater than 30%. After hardening, strength values of up to 1600 N/mm$^2$ with 10% ductility can be achieved.

Heating to the austenitizing temperature for the purpose of hardening is frequently performed heretofore by gas-heated or electrically heated continuous furnaces. In order to ensure a continuous production, such continuous furnaces are integrated into the manufacturing line for the structural body parts. However, a disadvantage is the great space requirement of such continuous furnaces. Furthermore, it should be noted that energy consumption is considerable and that heat losses cannot be avoided. Also, when using continuous furnaces, it is not possible to perform a partial or regional hardening of the structural body parts.

It is also known to shape hardenable steel sheets to the desired structural body parts with combination shaping and hardening tools. In this case, the blanks are heated before shaping to the austenitizing temperature and are then simultaneously shaped and hardened in a cooled shaping tool. This process also necessarily entails high tool and energy technological expenditures. Furthermore, this process increases considerably increases the cycle times during the shaping step.

It is also known to use inductive hardening for massive steel products, such as crankshafts, gears, bearing etc., as well as for closed elongate sections.

It would therefore be desirable and advantageous to provide an improved apparatus for heat treatment of open-profile elongate structural body parts in the automobile industry from ultrahigh-strength pressing parts so as to meet safety functions while requiring only minimal manufacturing and tool expenditure and ensuring a high efficiency with reduced energy consumption.

SUMMARY OF THE INVENTION

According to one aspect of the present invention, an apparatus for heat-treating an open-profile, elongate structural body part in the automobile industry which has been made at a thickness of 1 mm to 3 mm and tempered at least in regions thereof from a blank or steel strip of hardenable 22 Mn B5 mod. steel sheet, press-formed in soft state, for assuming safety functions, with the apparatus including a mechanism for positioning a structural body part in a substantially upright disposition, an induction element placed in surrounding relationship to the structural body part and moveable in relation to the structural body part from bottom to top so as to be able to follow a contour of the structural body part to thereby at least partially heat the structural body part to an austenitizing temperature suitable for hardening, a cooling unit constructed to follow the induction element in movement direction thereof, wherein the induction element and the cooling unit are moveable relative to one another, and a tool carriage for attachment of the induction element and the cooling unit, said tool carriage being mounted to a column for movement in a vertical direction, in a transverse direction to the column, and about a horizontal axis.

The present invention resolves prior art problems by using hardenable blanks or strip steels 22 Mn B5 mod. that can be shaped in soft state in pressing tools to the desired structural body part. The structural body parts can have varying cross-sections and may have highly complex configuration. Furthermore, the cross-section may change over the length of the structural body part. Also, the structural body part can easily be curved and the wall thickness of the structural body part can be kept extremely small. In general, the wall thickness is in the range of 1 mm to 3 mm.

After being press-formed, the structural body part is hardened in substantial vertical disposition. Heating during hardening is realized by the induction element which is able to move in correspondence to the profile of the structural body part relative thereto and is constructed to surround the structural body part and to conform to the cross-section of the structural body part. The induction element may be realized in the form of an induction coil with a single winding or several windings. Another example of an induction element may involve a construction in the form of a plate-shaped induction element which has the advantage of realizing a better efficiency and a more uniform heating of diverse cross-sections, when used in conjunction with complex pressed parts with varying cross-sections.

When the induction element is appropriately designed, it can simultaneously heat at least two structural body parts in side-by-side disposition, with the induction element surrounding hereby all structural body parts.

For achieving a uniform strength over the entire cross-section of the structural body part, a uniform heating must be ensured. For this purpose, the induction element can be matched to each of the structural body parts as needed. Furthermore, it is possible without problems to select a frequency for the induction current to match to the structural body part. When the cross-section of the structural body part changes over the length thereof, the advancing speed of the induction element and/or the power can be adjusted in order to ensure at all times a uniform heating temperature over the length of the structural body part as well as across the entire cross-section.

Cooling of the heated structural body part is carried out with the aid of a cooling unit which follows the induction element in its direction of movement. The induction element and the cooling unit can be moved upwardly from end to end (from bottom to top) relative to the stationary structural body part or, alternatively, the structural body part can be moved downwardly (from top to bottom) relative to the induction element and the cooling unit arranged below it. In this manner, it is ensured that the respective cooling medium comes into contact with the structural body part only after being heated so that heating and cooling are definitely separated from one another in time. Furthermore, contact of the liquid cooling medium with the induction element is prevented, and the risk of voltage flashover is eliminated.

The induction element and the cooling unit are guided along the contour of the structural body part such as to be positioned at all times substantially perpendicularly to the center axis of the cross-section of the structural body part. This ensures heating and cooling actions as uniform as possible even for complex, spatially curved structural body parts.

In accordance with the present invention, the induction element can be easily guided together with the cooling unit only over certain predetermined regions of the structural body parts to provide only these regions with the desired strength, so that the provision of different strength requirements in the individual regions of the structural body parts can easily be met. Compared to continuous furnaces, substantial costs are saved as far as configuration of the apparatus and energy consumption are concerned. Furthermore, another advantage is the minimization of the hardening distortion of the structural body part.

As a consequence of the deliberately envisioned partial hardening process, a directed adjustment of crash or failure behavior of the structural body parts can be achieved. Non-hardened regions of the structural body parts then form constructively desired folding and crumple (collapsible) zones which enhance the predefined deformation of the structural body parts. Thus, strength values can be regionally adjusted to the stress which the structural body part is exposed to, e.g., in analogy to the so-called tailored blanks comprised of different steel quality. However, in contrast to tailored blanks, there is no welding seam when employing inductive hardening. Furthermore, wide transitional strength zones can be realized, and an abrupt strength jump is thus prevented.

In order to adapt the hardening process to the requirements of different steel qualities with respect to the cooling rate, different types of cooling media can be used for cooling the structural body parts.

Moreover, any hardening distortion encountered during hardening, can be reduced by a suitable fixation of the structural body parts. The degrees of freedom of the mounting can directly influence the distortion behavior. It is also possible during press-forming of the structural body parts to provide a suitable configuration that takes into account any later hardening distortion. As a consequence, the dimensional precision of the structural body part is improved. In order to allow a simple adjustment to different configurations of the structural body parts, the mounting may be constructed of flexible design.

As the induction element and the cooling unit are moveable relative to one another, the spacing between the induction element and the cooling unit can be adjusted to thereby affect the cooling rate and thus the hardness or strength of the structural body parts.

According to another feature of the present invention, the induction element can be operated at high frequency. Currently preferred is a frequency from 400 kHz to 800 kHz. As a result, complex thin-walled structural body parts can be heated evenly across the entire cross section. At this high frequency, induced eddy current in the structural body parts is substantially uniformly distributed over the cross-section.

The cooling unit can be used to subject the structural body parts to different cooling media. According to another feature of the present invention, each structural body part can be subjected to a liquid stream in the area of the cooling unit. Examples of a cooling liquid include water, oil, or an oil/water mixture. By adjusting the volume stream and pressure of the cooling medium, the cooling rate can be determined and the microstructure and thus the hardness can be influenced according to the time-temperature-conversion diagram.

As an alternative to the exposure of the structural body parts to a cooling medium, it is also possible to provide a liquid mist that is sprayed onto the structural body part in the area of the cooling unit. Such a liquid mist is finely atomized. This produces a gentler cooling in comparison to the abrupt cooling action of a liquid. It is also possible to realize an incomplete cooling of the structural body parts, i.e., a certain residual heat is retained in the structural body part which then results in self-tempering of the structural body part.

According to another feature of the present invention, each structural body part may be exposed in the area of the cooling unit to a gaseous medium. Examples of a suitable gaseous medium include air or compressed air or an inert gas. Use of inert gas prevents scale formation at the structural body part. In this manner a possibly required scale removal, for example, by sand blasting, can be eliminated. Also, possible decarburization of the material of the structural body part can be prevented. As with the liquid mist, it is also possible to retain a certain residual heat in the structural body part when employing a gaseous medium. The residual heat then results in self-tempering of the structural body part.

According to another feature of the present invention, it is also possible to employ a gaseous cooling medium or a liquid mist in combination with a liquid for cooling of the heated structural body part. Accordingly, a slow cooling action by a gas stream or a liquid mist and a subsequent quenching with a liquid can be performed. The various cooling media are hereby arranged at different distances to the induction element. In this way, a defined course of cooling curves within the time-temperature-conversion diagram is possible.

It may also be conceivable to heat the structural body parts with the same induction element to a tempering temperature after hardening.

An apparatus according to the present invention has the following advantages:

increased efficiency of heat introduction;

reduced space requirements;

each structural body part can be partially hardened as desired according to specific requirements;

simplified integration into the entire manufacturing facility is realized.

no hot structural body parts need to be handled through integration of the quenching process by means of the cooling unit in the hardening device;

scale formation at structural body parts is considerably reduced;

wear and maintenance costs are significantly reduced because no movable parts of the hardening device are heated.

According to another feature of the present invention, the cooling unit can be divided into several cooling elements in the circumferential direction of the structural body part. In this way, any hardening distortion can be influenced more precisely. Suitably, the individual cooling elements are moveable relative to one another in order to influence even more precisely the hardening distortion.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic perspective view of one embodiment of apparatus in accordance with the present invention for hardening a structural body part;

FIG. 2 is a horizontal cross-section of the structural body part, taken along the line II—II in FIG. 1 as viewed in the direction of arrows IIa;

FIG. 4 is a schematic perspective view of still another variation of an apparatus in accordance with the present invention for hardening a structural body part;

FIG. 5 is a horizontal cross-section of the structural body part, taken along the line V—V in FIG. 4 as viewed in the direction of arrows Va;

DETAILED DESCRIPTION OF PREFERRED EMBODIMENTS

Figure 3:
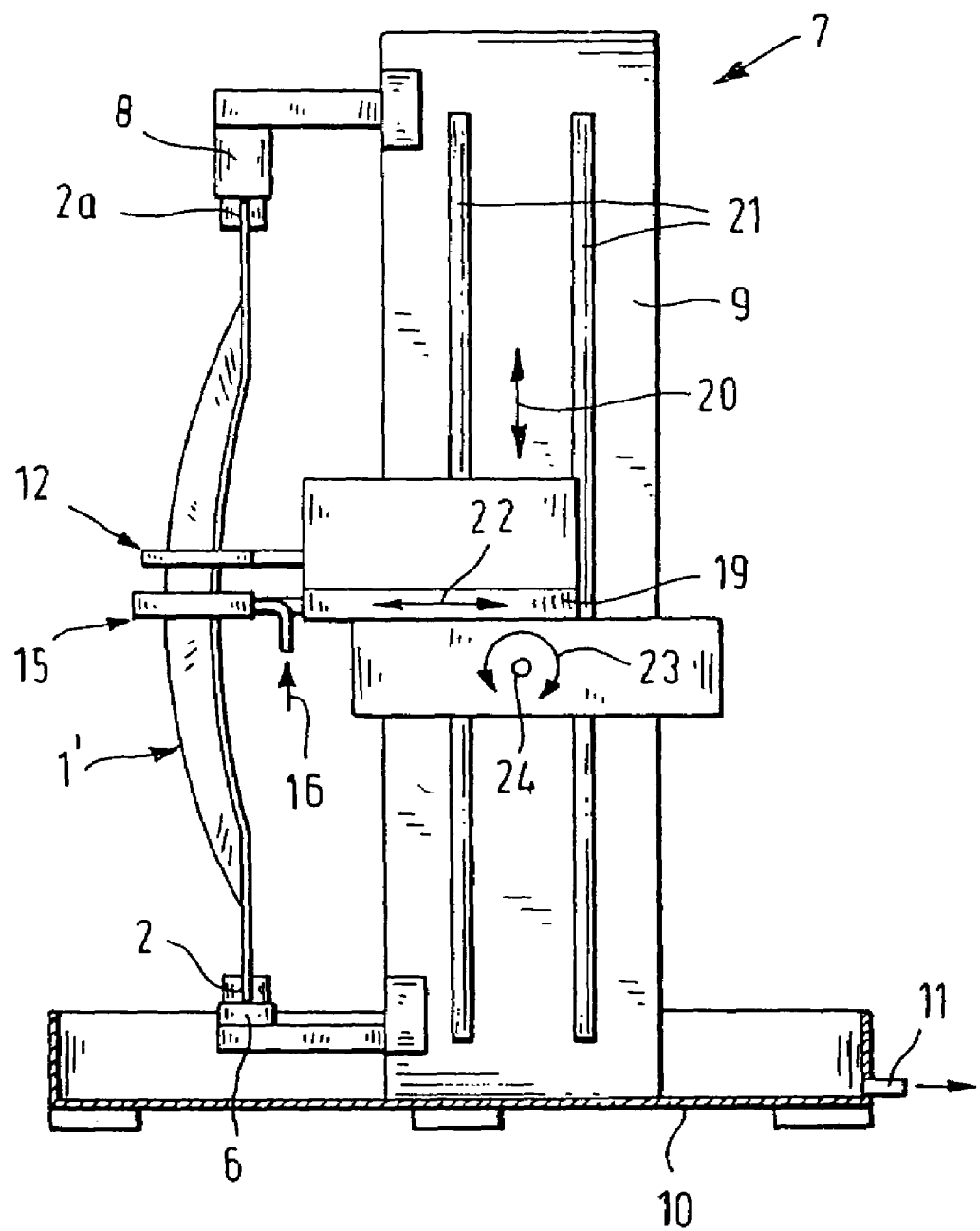
FIG. 3 is a schematic side view of another embodiment of an apparatus in accordance with the present invention for hardening a structural body part.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic perspective view of a first embodiment of an apparatus in accordance with the present invention for hardening a structural body part generally designated by reference numeral 1 and intended as side impact support. The structural body part 1 includes between fastening ends 2, 2a two grooves 3 that have a trapezoidal cross-section and have flanks 4 connected by a stay 5, as shown in FIG. 2. For such a structural body part 1 it is desirable to provide a certain strength at least over a portion of its length L.

For this purpose, the structural body part 1, or a structural body part 1' according to FIG. 3, is connected for hardening in a substantially vertical position with its lower end 2 at a thrust bearing 6 of the apparatus 7. The upper end 2a of the structural body part 1 is secured in a non-locating or floating bearing 8 of the apparatus 7.

The thrust bearing 6 as well as the non-locating bearing 8 are components of a column 9 which is positioned above a catch basin 10 for catching a liquid cooling medium. The catch basin 10 is provided with a drain 11 for removing heated cooling medium for the purpose of cooling and filtering.

The structural body part 1, 1' is surrounded according to FIGS. 1 and 3 by an induction element 12 having a cross-section that is substantially matched to the structural body part 1, 1'. The induction element 12 is operated at a frequency of 400 to 800 kHz, preferably 400 to 600 kHz, as is schematically illustrated in FIG. 1. It is cooled by a cooling medium. The inlets and outlets for the cooling medium are identified by reference numerals 13 and 14.

A cooling unit 15 is provided below the induction element 12 at a distance thereto and is movable to adjust the distance in relation to the induction element 12. The relative movement between the induction element 12 and the cooling unit 15 may be implemented in any manner currently known to an artisan so that a detailed description is omitted for the sake of simplicity. The cooling unit 15 also surrounds the structural body part 1, 1'. The cooling unit 15 in the shown embodiment is cooled by a cooling medium in the form of an emulsion of water and oil. The inlets and outlets for the cooling medium are identified by reference numerals 16 and 17.

As can be seen in FIG. 1, the cooling unit 15 can be divided in circumferential direction into different cooling elements 18. These cooling elements 18 can be position-adjusted relative to one another in any manner currently known to an artisan so that a detailed description is omitted for the sake of simplicity . . .

FIG. 3 shows also that the induction element 12 and the cooling unit 15 are connected to a tool carriage 19. The carriage 19 can be moved according to the double arrow 20 along guides 21 of the column 9 in the vertical direction, according to the double arrow 22 in the transverse direction, and according to the double arrow 23 about a horizontal axis 24. In this way it is possible to guide the induction element 12 and the cooling unit 15 in a directed manner according to the contour of the structural body part 1'.

In FIG. 4 a structural body part 1a in the form of a reinforcement for a B-column of a passenger car is represented in a perspective view. FIG. 5 shows the cross-section of the structural body part 1a at the lower end 25. The structural body part 1a is highly loaded only in the connecting region at the door sill of the passenger car so that it requires an increased strength only in this area.

For this purpose, the structural body part 1a is secured in a substantially vertical position at the lower end 25 and the upper end 26 by not shown securing means of the column 9. The longitudinal area L1 of the structural body part 1a is hardened by passing an induction element 12a, whose contour is matched to the cross-section of the structural body part 1a and which has a cooling unit 15a arranged therebelow, in the longitudinal direction (arrow 27) from the bottom to the top along the longitudinal area L1. The longitudinal area L1 can be heated by the induction element 12a to the austenitizing temperature required for hardening and can be cooled (quenched) by means of the cooling unit 15a.

Figure 6:
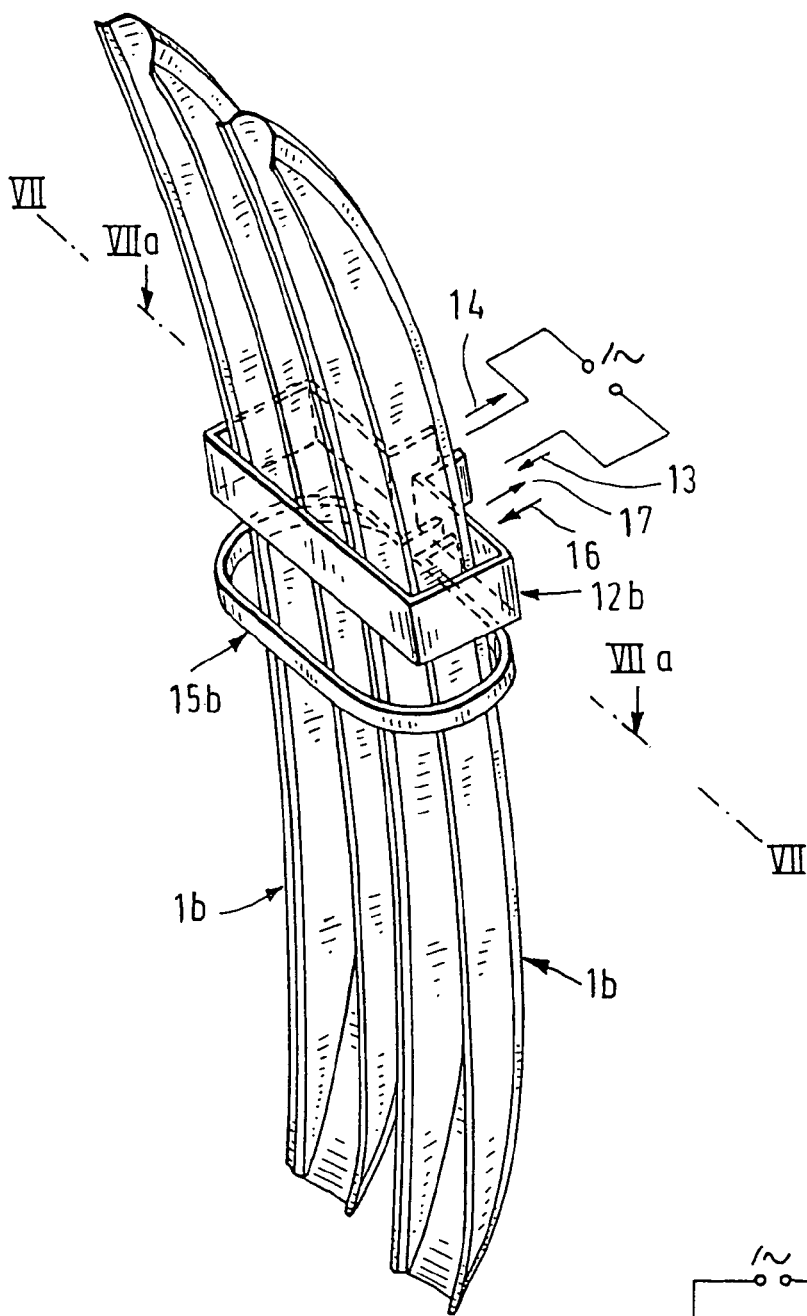
FIG. 6 is a schematic perspective view of yet another variation of an apparatus in accordance with the present invention for hardening two structural body parts.
Figure 7:
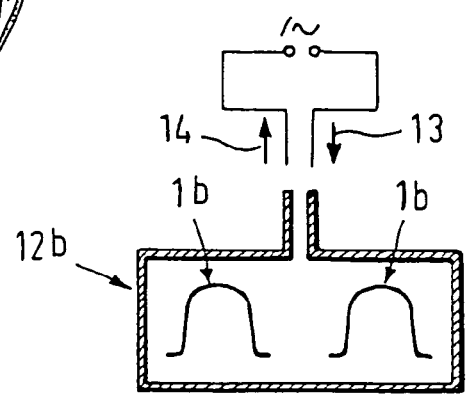
FIG. 7 is a horizontal cross-section of the apparatus of FIG. 6, taken along the line VII—VII as viewed in the direction of arrows VIIa.

In FIGS. 6 and 7 it is shown how simultaneously two structural body parts 1b of a trapezoidal cross-section can be heated by an induction element 12b in the form of a plate induction element and can be cooled with a following cooling unit 15b arranged below the induction element 12b.

In other respects, the method sequence corresponds to the method disclosed in connection with FIGS. 1 through 3 so that reference is made to the above explanations of the method steps. A device 7 according to FIG. 3 can also be used when its design is correspondingly adapted.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. Apparatus for heat-treating an open-profile elongate structural body part in the automobile industry, said apparatus comprising:
   a mechanism for maintaining a structural body part in a substantially fixed position;
   an induction element placed in surrounding relationship to the structural body part and moveable in relation to the structural body part from bottom to top;
   a cooling unit constructed to follow the induction element in movement direction thereof, wherein the induction element and the cooling unit are moveable relative to one another; and
   a tool carriage for attachment of the induction element and the cooling unit, said tool carriage being mounted to a column for movement in a vertical direction, in a transverse direction to the column, and about a horizontal axis so that the induction element is able to follow any contour of the structural body part to thereby at least partially heat the structural body part to an austenitizing temperature suitable for hardening.

2. The apparatus of claim 1, wherein the cooling unit includes a plurality of cooling elements arranged about a circumference of the structural body part.

3. The apparatus of claim 1, wherein the cooling elements are moveable relative to one another.

4. The apparatus of claim 1, wherein the induction element is constructed to operate at a frequency from 400 kHz to 800 kHz.

5. The apparatus of claim 1, wherein the induction element is constructed to operate at a frequency from 400 kHz to 600 kHz.

6. The apparatus of claim 1, wherein the cooling unit is constructed to circulate a liquid cooling medium.

7. The apparatus of claim 1, wherein the cooling unit is constructed to circulate a liquid cooling medium which is selected from the group consisting of oil, water, and oil/water mixture.

8. The apparatus of claim 1, wherein the cooling unit is constructed to expose the structural body part to a mist of liquid cooling medium.

9. The apparatus of claim 1, wherein the cooling unit is constructed to expose the structural body part to a gaseous cooling medium.

10. The apparatus of claim 1, wherein the cooling unit is constructed to expose the structural body part to a gaseous cooling medium which is selected from the group consisting of air, compressed air, and inert gas.

11. Apparatus for heat-treating an elongate structural body part in the automobile industry, comprising:
    a column having a mounting for holding a structural body part in a substantially upright disposition;
    a carriage mounted to the column for selective movement in a vertical direction, in a transverse direction to the column and about a horizontal axis;
    an induction element mounted to the carriage in surrounding relationship to the structural body part so as to be able to follow any contour of the structural body part and to thereby at least partially heat the structural body part to an austenitizing temperature; and
    a cooling unit mounted to the carriage adjacent to the induction element and moveable relative to the induction element.

12. The apparatus of claim 1, wherein the structural body part has a thickness of 1 mm to 3 mm and is tempered at least in regions thereof from a blank or steel strip of hardenable 22 Mn B5 mod. steel sheet, press-formed in soft state, for assuming safety functions.

13. The apparatus of claim 1, wherein the structural body part is held in a substantially upright disposition.

* * * * *